Dec. 3, 1957  J. WINTERBURN ET AL  2,815,237

FASTENING MECHANISM

Filed Nov. 27, 1953

United States Patent Office 2,815,237
Patented Dec. 3, 1957

2,815,237

FASTENING MECHANISM

John Winterburn and Derek H. Jones, Coventry, England, assignors to Armstrong Siddeley Motors Limited, Coventry, England Application November 27, 1953, Serial No. 394,844

Claims priority, application Great Britain December 20, 1952

4 Claims. (Cl. 292—256.71)

The invention relates to a means, for preventing the unintentional separation of two members (e. g., a cover and an associated container, as of an oil filter casing), of the kind in which a rotatable shaft has a screw-threaded engagement with one of the members for urging an abutment of the shaft on to the outer side of the other member which outer side is formed with teeth to be engaged by a biased pawl for normally preventing the shaft from unscrewing.

The object of the invention is to provide a ready means for retaining the shaft against unintentional unscrewing, while enabling it to be unscrewed, in a simple manner, by an intentional operation.

According to the invention, the pawl is pivoted on the shaft which has an operating member (e. g., a handle), supported for limited relative rotation in the unscrewing direction, for turning the shaft in either direction, the operating member having a cam means which, when the operating member is turned in the unscrewing direction to take up the lost motion, positively moves the pawl in the disengaging direction whereby to allow the shaft to be unscrewed.

Figure 1:
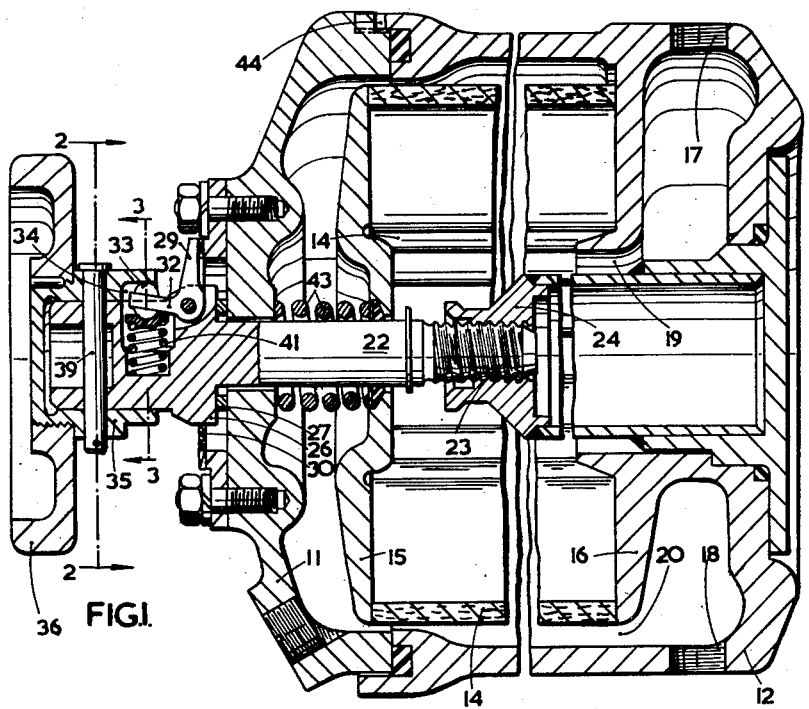
Figures 2, 4:
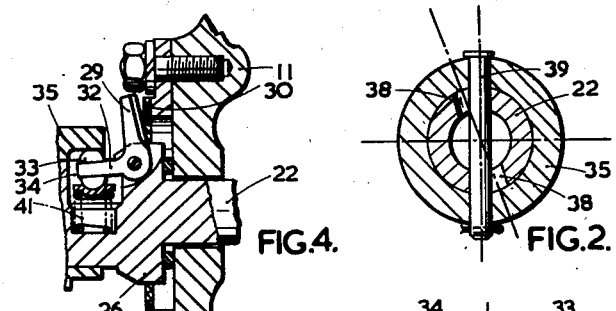
Figure 3:
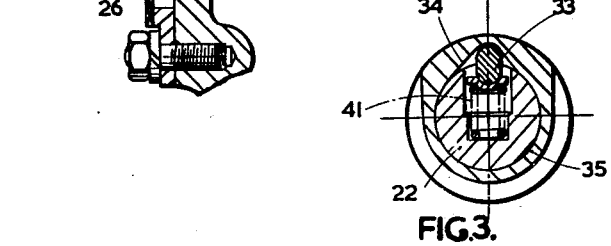

In the accompanying drawings:

Figure 1 is a sectional elevation showing one arrangement according to the invention;

Figures 2 and 3 are cross-sections taken on lines 2—2 and 3—3 of Figure 1 respectively; and Figure 4 is a fragmentary section of Figure 1 showing the pawl when released from the coacting teeth to enable the two main members to be separated.

The invention is shown as applied to the holding in position of a cover 11 of an oil filter casing 12. In Figure 1 the latter is shown as containing an annular filtering element 14 of known form, actually, a filtering element of wavy cross-section is shown, which is held pressed between axially-spaced flanges 15, 16, the latter being fast with the casing 11. The casing has inlets and outlets provided in it for the oil, and these may be diametrically opposite one another, as indicated at 17 and 18. The opening 17 communicates with the inside of the filtering element, as indicated at 19, and the opening 18 communicates with the outside of the filtering element, as indicated at 20.

In the present instance there is a shaft 22 having a screw-threaded engagement 23 with an anchorage 24 held centrally within the casing 12 at the end of the latter remote from the cover 11, the shaft extending freely through the cover to the outside where it has a shoulder 26 for applying a closing pressure to the cover through a sealing washer 27.

Outwardly of the shoulder the shaft has pivoted to it, on a chord-wise axis, a bell-crank lever of which one arm 29 acts as a pawl for coaction with a ring of teeth 30 (of ratchet or equivalent form) on the outer side of the cover and concentric with the shaft. The other arm 32 of the bell-crank lever has an egg-shaped projection 33 the outer end of which extends into a cam recess 34 (Figure 3) within a skirt portion 35 fast with a handle 36.

The handle, which may be in the form of a knob, has its skirt portion 35 journalled on a hollow outer end of the shaft, and the latter has two diametrically-opposed, circumferential slots 38 engaged by a pin 39 extending diametrically through and fixed in the skirt portion—see Figure 2. Thus, the handle 36 can be turned relatively to the shaft 22 through an angle equivalent to the length of the slots 38 minus the diameter of the pin 39.

The shaft has a blind bore extending radially into it in the region of the arm 32 of the bell-crank lever. The inner end of the egg-shaped projection 33 is seated on the outer end of a coiled compression spring 41 in the bore, the spring urging the outer end of the projection into the cam recess 34 normally to maintain the handle 35 in the position (shown in Figure 3) for screwing up the shaft without lost motion. The cam recess 34 is shaped to leave the pawl 29 room fully to engage with the ring of teeth 30.

When the handle 36 is turning the shaft in the direction to clamp down the cover 11, as shown in Figure 1, thereby also compressing the spring 43 against the slidable end plate 15, the pawl arm 29 of the bellcrank lever is free to click over the teeth 30 on the cover. On releasing the handle, the pawl is biased by the spring 41 to prevent unintentional rotation of the shaft in the unscrewing direction. But if the handle is turned in the unscrewing direction (anti-clockwise in Figure 2), the lost motion, occurring before a driving connection with the shaft is established through the pin 39 and slots 38, turns the cam recess 34 of the skirt portion 35 relatively to the projection 33 positively to withdraw the pawl against the bias of the spring 41 from the engaged teeth, thereby enabling the shaft to be unscrewed by a continuation of the turning of the handle in the unscrewing direction.

As it is obviously desirable that the cover 11 should be located against turning relatively to the casing 12, the drawings show the provision of a tooth 44 on the casing engaged in a recess at the adjacent end of the cover. Obviously, if desired, a number of circumferentially spaced teeth and recesses may be provided to facilitate engagement of these two parts.

What we claim as our invention and desire to secure by Letters Patent of the United States is:

1. A fastening mechanism for preventing the unintentional separation of two members, said fastening mechanism being of the kind in which said members are held together by a rotatable shaft having a screw-threaded engagement with one of the members and an abutment on the shaft disposed to operatively engage the other of said members, teeth formed on said other of said members on the side adjacent said abutment, a spring-pressed pawl pivoted upon said shaft for engaging said teeth, and an operating member supported on said shaft for limited relative rotation with respect thereto, said operating member having a cam means coacting with said pawl to positively move said pawl out of engagement with said teeth during the initial rotation of said operating member in the direction to separate said two members, and said cam means acting to hold said pawl out of engagement with said teeth while said operating member is rotated to cause separation of said two members.

2. A fastening mechanism for preventing the unintentional separation of two members which are held together by a rotatable shaft having a screw-threaded engagement with one of said members, said shaft having an abutment disposed to operatively engage the other of said members, teeth formed on said other of said members on the side adjacent said abutment, a spring-pressed pawl pivoted upon said shaft for engaging said teeth, said pawl being in the form of a bell crank lever, one arm of said bell crank lever adapted to engage said teeth, and an operating member supported on the shaft so as to allow angular lost motion between the operating member and the shaft and having a skirt portion formed on one side with a recess, cam means located in said recess in said skirt portion, the other arm of said bell crank lever extending into said recess to coact with said cam means and positively move said pawl out of engagement with said teeth during the initial rotation of the operating member in the direction to separate said two members, and said cam means acting on said bell crank lever to hold said pawl out of engagement with said teeth while said operating member is rotated to cause separation of said two members.

3. A fastening mechanism for preventing the unintentional separation of two members to be held together by a rotatable shaft having a screw-threaded engagement with one of said members, said shaft having an abutment disposed to operatively engage the other of said members, teeth formed on the other of said members on the side adjacent said abutment, a pawl pivoted upon said shaft for engaging said teeth, a spring carried by said shaft for biasing said pawl into engagement with the teeth, and an operating member supported on said shaft for limited relative rotation, said operating member having a cam means which coacts with said pawl to positively move said pawl out of engagement with said teeth during the initial rotation of said operating member in the direction to separate said two members, and said cam means acting to hold said pawl out of engagement with said teeth while said operating member is rotated to cause separation of said two members.

4. The combination with two separable members to be held together, of a rotatable shaft having a screw-threaded engagement with one of said members, said shaft extending through said other of said members and having an abutment to operatively engage the outer face thereof, ratchet teeth formed on said outer face, a bell crank pivoted upon said shaft, one arm of said bell crank formed as a pawl to engage said ratchet teeth and the other arm carrying a projection, an operating member supported on said shaft for limited angular motion with respect thereto, said operating member having a skirt portion formed on one side adjacent to said ratchet teeth, said skirt portion having a recess, cam means located in said recess in said skirt portion, said cam means coacting with said projection, and means biasing said pawl in the engaging direction comprising a compression spring disposed in a blind hole formed in said shaft, said cam means in said recess acting on said projection to move said pawl out of engagement with said ratchet teeth during the initial rotation of said operating member in the direction to separate said two members, and said cam means acting on said pawl to hold said pawl out of engagement with said ratchet teeth while said operating member is rotated to cause separation of said two members.

References Cited in the file of this patent

UNITED STATES PATENTS

| | | |
|---|---|---|
| 668,009 | Dakin | Feb. 12, 1901 |
| 1,664,820 | Hughes | Apr. 3, 1928 |
| 1,887,878 | Smith | Nov. 15, 1932 |
| 1,920,669 | Ricelli | Aug. 1, 1933 |
| 2,285,223 | Mueller | June 2, 1942 |
| 2,635,751 | Schroeder et al. | Apr. 21, 1953 |

OTHER REFERENCES

Jones: Ser. No. 241,476, vol. 670, p. 577 O. G.